(12) United States Patent
Lebeau et al.

(10) Patent No.: US 12,148,423 B2
(45) Date of Patent: *Nov. 19, 2024

(54) WORD-LEVEL CORRECTION OF SPEECH INPUT

(71) Applicant: Google LLC, Mountain View, CA (US)

(72) Inventors: Michael J. Lebeau, New York, NY (US); William J. Byrne, Davis, CA (US); John Nicholas Jitkoff, Palo Alto, CA (US); Brandon M. Ballinger, San Franciso, CA (US); Trausti T. Kristjansson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 827 days.

This patent is subject to a terminal disclaimer.

(21) Appl. No.: 17/340,729

(22) Filed: Jun. 7, 2021

(65) Prior Publication Data

US 2021/0295842 A1     Sep. 23, 2021

Related U.S. Application Data

(63) Continuation of application No. 16/854,670, filed on Apr. 21, 2020, now Pat. No. 11,037,566, which is a (Continued)

(51) Int. Cl.
*G10L 15/00* (2013.01)
*G06F 3/0482* (2013.01)
(Continued)

(52) U.S. Cl.
CPC .............. *G10L 15/22* (2013.01); *G06F 3/0482* (2013.01); *G06F 3/04842* (2013.01);
(Continued)

(58) Field of Classification Search
CPC ......... G10L 15/26; G10L 15/22; G10L 21/06; G10L 15/063; G10L 15/18; G10L 15/265;
(Continued)

(56) References Cited

U.S. PATENT DOCUMENTS

| 5,500,920 A | 3/1996 | Kupiec |
| 5,712,957 A | 1/1998 | Waibel et al. |

(Continued)

FOREIGN PATENT DOCUMENTS

| CN | 1538383 | 10/2004 |
| CN | 1538383 A | 10/2004 |

(Continued)

OTHER PUBLICATIONS

F. Seide, K. Thambiratnam and R. Peng Yu, "Word-lattice based spoken-document indexing with standard text indexers," 2008 IEEE Spoken Language Technology Workshop, Goa, India, 2008, pp. 293-296, doi: 10.1109/SLT.2008.4777898. (Year: 2008).*

(Continued)

*Primary Examiner* — Edgar X Guerra-Erazo
(74) *Attorney, Agent, or Firm* — Honigman LLP; Brett A. Krueger; Grant Griffith

(57) ABSTRACT

The subject matter of this specification can be implemented in, among other things, a computer-implemented method for correcting words in transcribed text including receiving speech audio data from a microphone. The method further includes sending the speech audio data to a transcription system. The method further includes receiving a word lattice transcribed from the speech audio data by the transcription system. The method further includes presenting one or more transcribed words from the word lattice. The method further includes receiving a user selection of at least one of the presented transcribed words. The method further includes presenting one or more alternate words from the word lattice for the selected transcribed word. The method further includes receiving a user selection of at least one of the alternate words. The method further includes replacing the selected transcribed word in the presented transcribed words with the selected alternate word.

20 Claims, 6 Drawing Sheets

Related U.S. Application Data continuation of application No. 15/849,967, filed on Dec. 21, 2017, now Pat. No. 10,672,394, which is a continuation of application No. 15/608,110, filed on May 30, 2017, now Pat. No. 9,881,608, which is a continuation of application No. 15/350,309, filed on Nov. 14, 2016, now Pat. No. 9,711,145, which is a continuation of application No. 15/045,571, filed on Feb. 17, 2016, now Pat. No. 9,542,932, which is a continuation of application No. 14/988,201, filed on Jan. 5, 2016, now Pat. No. 9,466,287, which is a continuation of application No. 14/747,306, filed on Jun. 23, 2015, now Pat. No. 9,263,048, which is a continuation of application No. 13/947,284, filed on Jul. 22, 2013, now Pat. No. 9,087,517, which is a continuation of application No. 12/913,407, filed on Oct. 27, 2010, now Pat. No. 8,494,852.

(60) Provisional application No. 61/292,440, filed on Jan. 5, 2010.

(51) Int. Cl.
| | |
|---|---|
| *G06F 3/04842* | (2022.01) |
| *G06F 3/04886* | (2022.01) |
| *G06F 40/137* | (2020.01) |
| *G06F 40/166* | (2020.01) |
| *G06F 40/232* | (2020.01) |
| *G06F 40/284* | (2020.01) |
| *G10L 15/01* | (2013.01) |
| *G10L 15/22* | (2006.01) |
| *G10L 15/26* | (2006.01) |
| *G10L 15/30* | (2013.01) |

(52) U.S. Cl.
CPC ........ *G06F 3/04886* (2013.01); *G06F 40/137* (2020.01); *G06F 40/166* (2020.01); *G06F 40/232* (2020.01); *G06F 40/284* (2020.01); *G10L 15/01* (2013.01); *G10L 15/26* (2013.01); *G10L 15/30* (2013.01)

(58) Field of Classification Search
CPC ... G10L 15/1815; G10L 21/10; G10L 15/183; G10L 15/1822; G10L 15/197; G10L 17/005; G10L 17/22; G06F 17/28; G06F 17/21

See application file for complete search history.

(56) References Cited

U.S. PATENT DOCUMENTS

| | | | |
|---|---|---|---|
| 5,794,189 A | 8/1998 | Gould | |
| 5,799,273 A | 8/1998 | Mitchell et al. | |
| 5,799,279 A | 8/1998 | Gould et al. | |
| 5,829,000 A | 10/1998 | Huang et al. | |
| 5,855,000 A | 12/1998 | Waibel et al. | |
| 5,857,099 A | 1/1999 | Mitchell et al. | |
| 5,864,805 A | 1/1999 | Chen et al. | |
| 5,899,976 A | 5/1999 | Rozak | |
| 5,909,667 A | 6/1999 | Leontiades et al. | |
| 5,937,380 A | 8/1999 | Segan | |
| 5,952,942 A | 9/1999 | Balakrishnan et al. | |
| 5,960,394 A | 9/1999 | Gould et al. | |
| 5,970,451 A | 10/1999 | Lewis et al. | |
| 6,055,515 A | 4/2000 | Consentino et al. | |
| 6,088,671 A | 7/2000 | Gould et al. | |
| 6,182,028 B1 | 1/2001 | Karaali et al. | |
| 6,192,343 B1 | 2/2001 | Morgan et al. | |
| 6,286,064 B1 | 9/2001 | King et al. | |
| 6,314,397 B1 | 11/2001 | Lewis et al. | |
| 6,327,566 B1 | 12/2001 | Vanbuskirk et al. | |
| 6,338,035 B1 | 1/2002 | Mori | |
| 6,374,214 B1 | 4/2002 | Friedland et al. | |
| 6,374,220 B1 | 4/2002 | Kao | |
| 6,397,181 B1 | 5/2002 | Li et al. | |
| 6,405,170 B1 | 6/2002 | Phillips et al. | |
| 6,581,033 B1 | 6/2003 | Reynar et al. | |
| 6,606,598 B1 | 8/2003 | Holthouse et al. | |
| 6,735,565 B2 | 5/2004 | Gschwendtner | |
| 6,836,759 B1 | 12/2004 | Williamson et al. | |
| 6,912,498 B2 | 6/2005 | Stevens et al. | |
| 7,003,457 B2 | 2/2006 | Halonen et al. | |
| 7,130,798 B2 | 10/2006 | Williamson et al. | |
| 7,149,970 B1 | 12/2006 | Pratley et al. | |
| 7,203,288 B1 | 4/2007 | Dwyer et al. | |
| 7,216,077 B1 | 5/2007 | Padmanabhan et al. | |
| 7,310,600 B1 | 12/2007 | Garner et al. | |
| 7,383,185 B1 | 6/2008 | Mohri | |
| 7,395,203 B2 | 7/2008 | Wu et al. | |
| 7,430,508 B2 | 9/2008 | Williamson et al. | |
| 7,440,895 B1 | 10/2008 | Miller et al. | |
| 7,440,896 B2 | 10/2008 | Williamson et al. | |
| 7,444,286 B2 | 10/2008 | Roth et al. | |
| 7,457,466 B2 | 11/2008 | Williamson et al. | |
| 7,542,902 B2 | 6/2009 | Scahill et al. | |
| 7,590,535 B2 | 9/2009 | Williamson et al. | |
| 7,634,408 B1 | 12/2009 | Mohri | |
| 7,675,435 B2 | 3/2010 | Sun et al. | |
| 7,809,574 B2 | 10/2010 | Roth et al. | |
| 7,904,296 B2 | 3/2011 | Morris | |
| 7,930,168 B2 | 4/2011 | Weng et al. | |
| 7,949,524 B2 | 5/2011 | Saitoh et al. | |
| 7,974,844 B2 | 7/2011 | Sumita | |
| 7,983,912 B2 | 7/2011 | Hirakawa et al. | |
| 8,010,360 B2 | 8/2011 | Bacchiani et al. | |
| 8,036,464 B2 | 10/2011 | Sridhar et al. | |
| 8,155,959 B2 | 4/2012 | Weng et al. | |
| 8,209,175 B2 | 6/2012 | Mukerjee et al. | |
| 8,214,210 B1 | 7/2012 | Woods | |
| 8,355,914 B2 | 1/2013 | Joh et al. | |
| 8,438,142 B2 | 5/2013 | Wu et al. | |
| 8,494,852 B2 * | 7/2013 | LeBeau | G10L 15/30 704/235 |
| 8,831,946 B2 | 9/2014 | Mamou | |
| 8,972,240 B2 | 3/2015 | Brockett et al. | |
| 9,009,041 B2 * | 4/2015 | Zavaliagkos | G10L 15/26 704/238 |
| 9,087,517 B2 * | 7/2015 | LeBeau | G06F 40/137 |
| 9,263,048 B2 * | 2/2016 | LeBeau | G06F 3/0482 |
| 9,418,152 B2 | 8/2016 | Nissan et al. | |
| 9,466,287 B2 * | 10/2016 | LeBeau | G06F 3/04886 |
| 9,542,932 B2 * | 1/2017 | LeBeau | G10L 15/01 |
| 9,711,145 B2 * | 7/2017 | LeBeau | G06F 40/137 |
| 10,672,394 B2 * | 6/2020 | LeBeau | G06F 40/284 |
| 11,037,566 B2 * | 6/2021 | Lebeau | G06F 40/166 |
| 2001/0041978 A1 | 11/2001 | Crespo et al. | |
| 2002/0052740 A1 | 5/2002 | Charlesworth et al. | |
| 2002/0052742 A1 | 5/2002 | Thrasher et al. | |
| 2002/0091520 A1 | 7/2002 | Endo et al. | |
| 2003/0104839 A1 | 6/2003 | Kraft et al. | |
| 2003/0112277 A1 | 6/2003 | Shteyn | |
| 2003/0182113 A1 | 9/2003 | Huang | |
| 2003/0187642 A1 | 10/2003 | Ponceleon et al. | |
| 2003/0216912 A1 | 11/2003 | Chino | |
| 2004/0024601 A1 | 2/2004 | Gopinath et al. | |
| 2004/0030556 A1 | 2/2004 | Bennett | |
| 2004/0083109 A1 | 4/2004 | Halonen et al. | |
| 2004/0153321 A1 | 8/2004 | Chung et al. | |
| 2005/0005240 A1 | 1/2005 | Reynar et al. | |
| 2005/0043949 A1 | 2/2005 | Roth et al. | |
| 2005/0055209 A1 | 3/2005 | Epstein et al. | |
| 2005/0086059 A1 | 4/2005 | Bennett | |
| 2005/0091054 A1 | 4/2005 | Thrasher et al. | |
| 2005/0159950 A1 | 7/2005 | Roth et al. | |
| 2005/0203751 A1 | 9/2005 | Stevens et al. | |
| 2006/0036438 A1 | 2/2006 | Chang | |
| 2006/0055567 A1 | 3/2006 | Park et al. | |
| 2006/0167686 A1 | 7/2006 | Kahn | |
| 2006/0293889 A1 | 12/2006 | Kiss et al. | |
| 2006/0293890 A1 | 12/2006 | Blair et al. | |

(56) References Cited

U.S. PATENT DOCUMENTS

| | | |
|---|---|---|
| 2007/0005372 A1 | 1/2007 | Huning et al. |
| 2007/0011012 A1 | 1/2007 | Yurick et al. |
| 2007/0033037 A1 | 2/2007 | Mowatt et al. |
| 2007/0073540 A1 | 3/2007 | Hirakawa et al. |
| 2007/0100635 A1 | 5/2007 | Mahajan et al. |
| 2007/0106492 A1 | 5/2007 | Kim |
| 2007/0106732 A1 | 5/2007 | Weis |
| 2007/0150275 A1 | 6/2007 | Garner et al. |
| 2007/0208567 A1 | 9/2007 | Amento et al. |
| 2007/0288670 A1 | 12/2007 | Lee |
| 2008/0052073 A1 | 2/2008 | Goto et al. |
| 2008/0059186 A1 | 3/2008 | Mowatt et al. |
| 2008/0077406 A1 | 3/2008 | Ganong |
| 2008/0077859 A1 | 3/2008 | Schabes et al. |
| 2008/0154576 A1 | 6/2008 | Wu et al. |
| 2008/0162137 A1 | 7/2008 | Saitoh et al. |
| 2008/0300874 A1 | 12/2008 | Gavalda et al. |
| 2009/0067719 A1 | 3/2009 | Sridhar et al. |
| 2009/0276215 A1 | 11/2009 | Hager |
| 2009/0306980 A1 | 12/2009 | Shin |
| 2009/0326938 A1 | 12/2009 | Marila et al. |
| 2009/0327279 A1 | 12/2009 | Adachi et al. |
| 2010/0179801 A1 | 7/2010 | Huynh et al. |
| 2010/0287486 A1 | 11/2010 | Coddington |
| 2011/0022393 A1 | 1/2011 | Waller et al. |
| 2011/0066970 A1 | 3/2011 | Burrier et al. |
| 2011/0125499 A1 | 5/2011 | Griggs et al. |
| 2011/0137653 A1 | 6/2011 | Ljolje et al. |
| 2011/0145224 A1 | 6/2011 | Bangalore |
| 2011/0161347 A1 | 6/2011 | Johnston |
| 2011/0202386 A1 | 8/2011 | Hamlisch et al. |
| 2012/0016671 A1 | 1/2012 | Jaggi et al. |
| 2012/0059652 A1 | 3/2012 | Adams et al. |
| 2012/0059653 A1 | 3/2012 | Adams et al. |
| 2012/0203776 A1 | 8/2012 | Nissan |
| 2012/0215539 A1 | 8/2012 | Juneja |
| 2013/0030804 A1* | 1/2013 | Zavaliagkos ........... G10L 15/24 704/235 |
| 2013/0030805 A1 | 1/2013 | Suzuki et al. |
| 2013/0289993 A1 | 10/2013 | Rao |
| 2014/0058732 A1 | 2/2014 | Labsky et al. |
| 2021/0295842 A1* | 9/2021 | LeBeau ................. G06F 40/232 |

FOREIGN PATENT DOCUMENTS

| | | |
|---|---|---|
| CN | 1555553 | 12/2004 |
| CN | 1555553 A | 12/2004 |
| CN | 1758211 | 4/2006 |
| CN | 1758211 A | 4/2006 |
| CN | 101042867 | 9/2007 |
| CN | 101042867 A | 9/2007 |
| CN | 101238508 | 8/2008 |
| CN | 101238508 A | 8/2008 |
| EP | 1094445 | 4/2001 |
| EP | 1094445 A2 | 4/2001 |
| JP | 2008090625 | 4/2008 |
| JP | 2008090625 A | 4/2008 |
| JP | 2009086063 | 4/2009 |
| JP | 2009086063 A | 4/2009 |
| KR | 20090097292 | 9/2009 |
| KR | 20090097292 A | 9/2009 |

OTHER PUBLICATIONS

Notice of Allowance issued in U.S. Appl. No. 13/947,284 on Apr. 2, 2015, 8 pages.
Notice of Allowance issued in U.S. Appl. No. 15/608,110, mailed on Nov. 6, 2017, 5 pages.
Notice of Office Action issued in Korean Application No. 10-2012-7020493, mailed on Feb. 27, 2017, 17 pages (with English translation).
Office Action issued in Canadian Application No. 2786313, mailed on Jul. 24, 2017, 5 pages.
Office Action issued in Chinese Application No. 201180008973.4 on Sep. 5, 2014, 21 pages (with English translation).
Office Action issued in Chinese Application No. 20150420200.7, mailed on Jul. 3, 2017, 11 pages (English translation).
Office Action issued in Korean Application No. 10-2017-7017613, mailed on Sep. 26, 2017, 7 pages (English Translation).
Office Action issued in U.S. Appl. No. 12/913,407 on Jan. 23, 2013, 24 pages.
Office Action issued in U.S. Appl. No. 12/913,407 on Oct. 17, 2012, 28 pages.
Office Action issued in U.S. Appl. No. 13/249,539 on Dec. 23, 2011, 21 pages.
Office Action issued in U.S. Appl. No. 13/249,539 on Jul. 13, 2012, 34 pages.
Office Action issued in U.S. Appl. No. 13/249,539 on Nov. 26, 2012, 26 pages.
Office Action issued in U.S. Appl. No. 13/620,213 on Jan. 3, 2013, 9 pages.
Office Action issued in U.S. Appl. No. 13/947,284 on Oct. 24, 2014, 20 pages.
Office Action issued in U.S. Appl. No. 14/747,306 on Aug. 10, 2015, 16 pages.
Office Action issued in U.S. Appl. No. 14/988,201 on Apr. 15, 2016, 14 pages.
Office Action issued in U.S. Appl. No. 15/045,571 on Apr. 22, 2016, 15 pages.
Office Action issued in U.S. Appl. No. 15/350,309, mailed on Mar. 10, 2017, 9 pages.
Office Action issued in U.S. Appl. No. 15/608,110, mailed on Jul. 14, 2017, 11 pages.
Office Action issued in U.S. Appl. No. 15/608,110, mailed on Oct. 18, 2017, 10 pages.
Quillsoft "What Can I Do With SpeakQ?" [online] [retrieved from the internet]; http://web.archive.org/web/20080611104620/www.wordq.com/speakqenglish.html (2008) 4 pages.
Quillsoft "What Can I Do With WordQ?" [online] [retrieved from the internet] http://web.archive.org/web/20080623083540/www.wordq.com/wordq2english.html (2008) 3 pages.
Korean Office Action for the related Application No. 10-2018-7013338 dated Aug. 10, 2018.
Canadian Search Report for the related application No. 2786313 dated Feb. 14, 2019.
Indian Examination Report for the related Appplication No. 201948013858, Dated Oct. 20, 2020, 7 pages.

* cited by examiner

000
WORD-LEVEL CORRECTION OF SPEECH INPUT

CROSS-REFERENCE TO RELATED APPLICATIONS

This application is a continuation of, and claims priority under 35 U.S.C. § 120 from, U.S. patent application Ser. No. 16,854,670, filed on Apr. 21, 2020, which is a continuation of U.S. patent application Ser. No. 15/849,967, filed on Dec. 21, 2017, which is a continuation of U.S. Patent Application Ser. No. 15,608, 110, filed on May 30, 2017, which is a continuation of U.S. patent application Ser. No. 15,350,309, filed on Nov. 14, 2016, which is a continuation of U.S. application Ser. No. 15,045,571, filed on Feb. 17, 2016, which is a continuation of U.S. application Ser. No. 14,988, 201, filed on Jan. 5, 2016, which is continuation of U.S. application Ser. No. 14,747,306, filed on Jun. 23, 2015, which is a continuation of U.S. application Ser. No. 13,947, 284, filed on Jul. 22, 2013, which is a continuation of U.S. application Ser. No. 12,913,407, filed on Oct. 27, 2010, which claims priority under 35 U.S.C. § 119(e), to U.S. Provisional Application No. 61/292,440, filed on Jan. 5, 2010. The disclosures of these prior applications are considered part of the disclosure of this application and are hereby incorporated by reference in their entireties.

TECHNICAL FIELD

This instant specification relates to correcting one or more words in text transcribed from speech input to a computing device.

BACKGROUND

Transcription of speech input is an increasingly popular way of inputting information into a computing device. This is even more true for mobile computing devices, such as mobile telephones and smartphones, where the interfaces available to the user for making user inputs are not as easy to manipulate as user interfaces in a desktop computer, such as a full-size keyboard. For example, some mobile computing devices use a minimal hardware keyboard (e.g., a subset of the full QWERTY keyboard), a virtual/software keyboard (e.g., a touchscreen keyboard), or even a twelve key telephone keypad (e.g., ITU-T text entry). Typically, these user input interfaces are smaller than traditional desktop user interfaces and users often type using their thumbs or otherwise hunt and peck while typing. This may account at least in part for the increasing use of speech input to mobile computing devices.

SUMMARY

In general, this document describes correcting one or more words in text transcribed from speech input to a computing device. In some implementations, the computing device is a wireless mobile device, such as a mobile telephone or a smartphone. The computing device receives a speech input, e.g., from a user, and sends the speech input to a transcription system that is separate from the computing device. The transcription system transcribes the speech input and provides a corresponding word lattice to the computing device. The computing device allows the user to make corrections to one or more words in the transcribed text using alternate words and/or phrases from the word lattice.

In a first aspect, a computer-implemented method for correcting words in transcribed text includes receiving speech audio data from a microphone in a mobile computing device. The method further includes sending the speech audio data from the mobile computing device to a transcription system. The method further includes receiving, at the mobile computing device, a word lattice transcribed from the speech audio data by the transcription system. The method further includes presenting one or more transcribed words from the word lattice on a display screen of the mobile computing device. The method further includes receiving, at the mobile computing device, a user selection of at least one of the presented transcribed words. The method further includes in response to receiving the user selection of the transcribed word, presenting one or more alternate words on the display screen from the word lattice for the selected transcribed word. The method further includes receiving, at the mobile computing device, a user selection of at least one of the alternate words. The method further includes in response to receiving the user selection of the alternate word, replacing the selected transcribed word in the presented transcribed words with the selected alternate word.

Implementations can include any, all, or none of the following features. The method can include in response to receiving the user selection of the transcribed word, presenting a remove command on the display screen for the selected transcribed word; receiving, at the mobile computing device, a user selection of the remove command; and in response to receiving the user selection of the remove command, removing the selected transcribed word from the presented transcribed words. The method can include presenting at least one alternate phrase on the display screen from the word lattice for the presented transcribed words; receiving, at the mobile computing device, a user selection of the alternate phrase; and in response to receiving the user selection of the alternate phrase, replacing the presented transcribed words with the selected alternate phrase. The method can include in response to receiving the user selection of the alternate word or the remove command, automatically selecting at least one new alternate phrase from the word lattice based on the selected alternate word or the removed transcribed word; and replacing the presented alternate phrase with the new alternate phrase. Receiving the user selection of the presented word and the user selection of the alternate word can include receiving the user selection of the presented word and the user selection of the alternate word through a touchscreen interface of the mobile computing device. The word lattice can include nodes corresponding to the transcribed words and the alternate words, edges between the nodes that identify possible paths through the word lattice, and each path can have an associated probability of being correct. The method can include identifying the alternate words for the selected transcribed word from one or more alternate paths between a beginning node and an ending node of the selected transcribed word in the word lattice. The method can include identifying the alternate phrase for the presented transcribed words from at least one alternate path between a beginning node and an ending node of the presented transcribed words in the word lattice.

In a second aspect, a computer program product, encoded on a computer-readable medium, operable to cause one or more processors to perform operations for correcting words in transcribed text, the operations include receiving speech audio data from a microphone in a mobile computing device. The operations further include sending the speech audio data from the mobile computing device to a transcription system.

The operations further include receiving, at the mobile computing device, a word lattice transcribed from the speech audio data by the transcription system. The operations further include presenting one or more transcribed words from the word lattice on a display screen of the mobile computing device. The operations further include receiving, at the mobile computing device, a user selection of at least one of the presented transcribed words. The operations further include in response to receiving the user selection of the transcribed word, presenting one or more alternate words on the display screen from the word lattice for the selected transcribed word. The operations further include receiving, at the mobile computing device, a user selection of at least one of the alternate words. The operations further include in response to receiving the user selection of the alternate word, replacing the selected transcribed word in the presented transcribed words with the selected alternate word.

Implementations can include any, all, or none of the following features. The operations can include in response to receiving the user selection of the transcribed word, presenting a remove command on the display screen for the selected transcribed word; receiving, at the mobile computing device, a user selection of the remove command; and in response to receiving the user selection of the remove command, removing the selected transcribed word from the presented transcribed words. The operations can include presenting at least one alternate phrase on the display screen from the word lattice for the presented transcribed words; receiving, at the mobile computing device, a user selection of the alternate phrase; and in response to receiving the user selection of the alternate phrase, replacing the presented transcribed words with the selected alternate phrase. The operations can include in response to receiving the user selection of the alternate word or the remove command, automatically selecting at least one new alternate phrase from the word lattice based on the selected alternate word or the removed transcribed word; and replacing the presented alternate phrase with the new alternate phrase. Receiving the user selection of the presented word and the user selection of the alternate word can include receiving the user selection of the presented word and the user selection of the alternate word through a touchscreen interface of the mobile computing device. The word lattice can include nodes corresponding to the transcribed words and the alternate words, edges between the nodes that identify possible paths through the word lattice, and each path can have an associated probability of being correct. The operations can include identifying the alternate words for the selected transcribed word from one or more alternate paths between a beginning node and an ending node of the selected transcribed word in the word lattice. The operations can include identifying the alternate phrase for the presented transcribed words from at least one alternate path between a beginning node and an ending node of the presented transcribed words in the word lattice.

In a third aspect, a computer-implemented system for correcting words in transcribed text includes a transcription system operable to receive speech audio data and in response transcribe the speech audio data into a word lattice. The system further includes a mobile computing device that includes a microphone operable to receive speech audio and generate the speech audio data, a network interface operable to send the speech audio data to the transcription system and in response receive the word lattice from the transcription system, a display screen operable to present one or more transcribed words from the word lattice, a user interface operable to receive a user selection of at least one of the transcribed words, one or more processors and a memory storing instructions that when executed by the processors perform operations to present one or more alternate words on the display screen from the word lattice for the selected transcribed word, receive a user selection of at least one of the alternate words, and replace the selected transcribed word in the presented transcribed words with the selected alternate word.

The systems and techniques described here may provide one or more of the following advantages. First, a system can make a correction to one or more words in transcribed text with a minimum of user inputs, such as one, two, or three user inputs. Second, a system can provide transcription of a speech input into text at a remote transcription system without, or with a minimum of, additional communication to the remote transcription system during correction of one or more words in the transcribed text. Third, a system can provide efficient user selection of corrections to transcribed text in a computing device with limited input interfaces, such as a small touchscreen.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
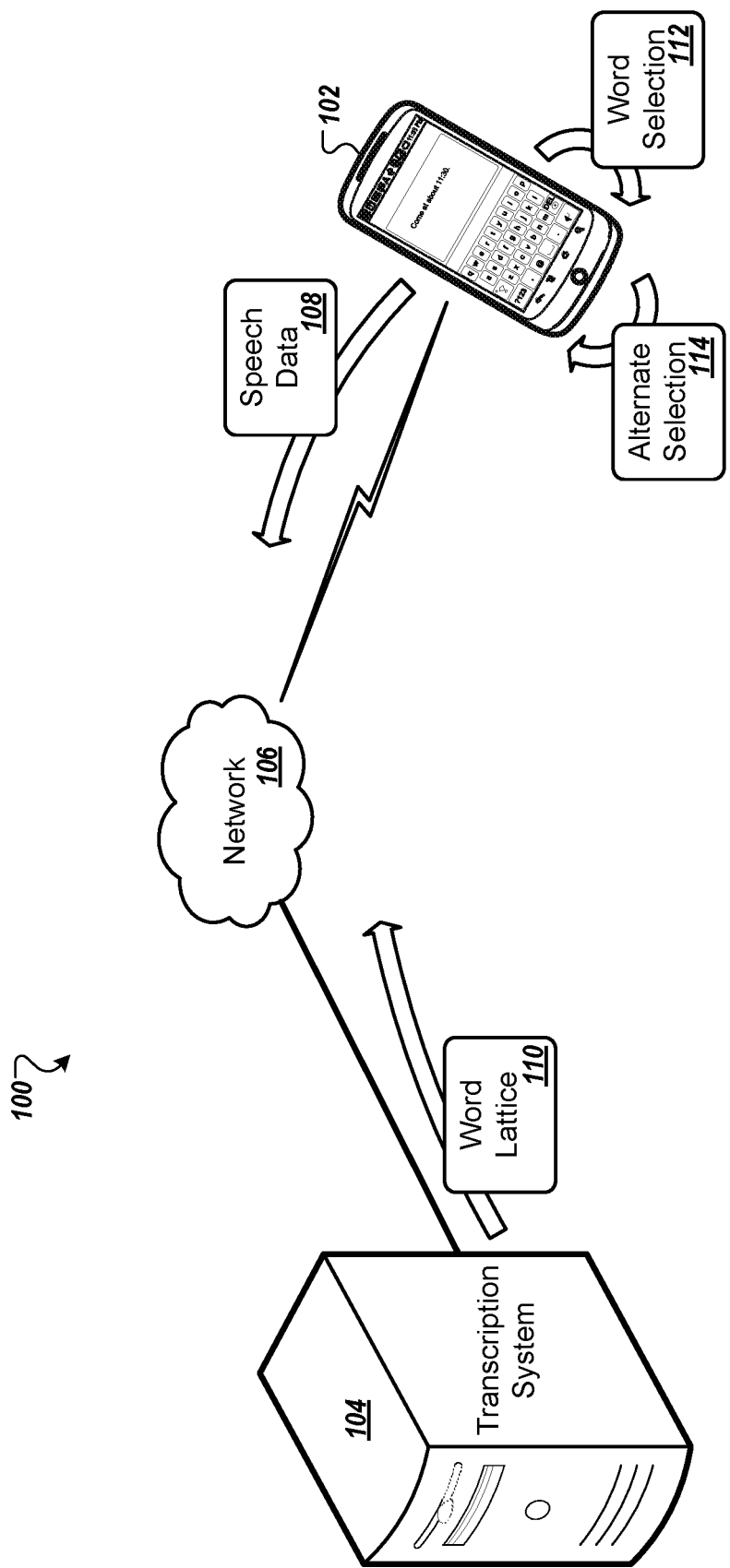
FIG. 1 is a schematic diagram that shows an example of a system for correcting one or more words in transcribed text.

FIG. 1 is a schematic diagram that shows an example of a system 100 for correcting one or more words in transcribed text. In general, the system allows a user's device to send audio data of speech to a server system, and for the server system to send back an arrangement of possible solutions for transcribing the speech, so that if a first suggested solution is not accurate, the user can easily substitute other words or sets of words that were determined by the server system to be other possible solutions.

The system 100 includes a mobile computing device 102 in communication with a transcription system 104 over a network 106. The mobile computing device 102 receives a speech audio input from a user and converts the speech audio into a speech data output 108. The mobile computing device 102 sends the speech data output 108 to the transcription system 104 over the network 106. The transcription system 104 transcribes the speech data output 108 into a plurality of words and arranges the words in a word lattice 110. The word lattice 110 includes a most likely or best hypothesis for the transcription of the speech data output 108 as well as alternate transcriptions or hypotheses. The transcription system 104 sends the word lattice 110 to the mobile computing device 102.

The mobile computing device 102 presents the most likely transcription from the word lattice 110 to the user. The mobile computing device 102 then receives one or more word selections 112 from the user, presents corresponding alternate words for the selected words, and receives one or more alternate selections 114 from the user. The word selections 112 indicate one or more incorrectly transcribed words in the transcribed text presented to the user. In some implementations, the alternate words are the next best hypotheses for the incorrect words. In response to the alternate selections 114, the mobile computing device 102 replaces the incorrect words in the presented transcribed text with the selected alternate words.

In some implementations, the mobile computing device 102 also presents one or more alternate phrases for the transcribed text. For example, the alternate phrase may be a next best hypothesis for transcription of the speech data output 108 or a portion of the speech data output 108 that includes multiple words. The mobile computing device 102 can receive a selection of an alternate phrase from the user and replaces the corresponding portion of the presented transcribed text with the selected alternate phrase.

In some implementations, the mobile computing device 102 is a mobile telephone or smartphone and includes a limited user input interface, such as a small QWERTY hardware keyboard, a small touchscreen, or a numeric keypad. The mobile computing device 102 accesses the network 106 using a wireless connection, such as a cellular telephone data connection, a Wi-Fi connection, or other wireless connection that can be used for sending data to and receiving data from the transcription system 104.

In some implementations, the network 106 includes one or more networks, such as a local area network, a wide area network, and/or the Internet. One or more of the networks in the network 106 may be wireless, such as a cellular telephone network or a Wi-Fi network.

The transcription system 104 includes a speech recognizer that transcribes the speech data output 108 into the word lattice 110. In general, the word lattice 110 includes multiple hypotheses for the transcription of the speech data output 108. In some implementations, the word lattice 110 includes one or more weighting factors or probabilities that a particular word occurs at a particular location in the transcribed text. Each hypothesis for the transcription of the utterance represents a possible path through the word lattice 110. In some implementations, branch points from one word to the next in a hypothesis depend on the other words in the hypothesis. For example, a particular word in the word lattice 110 may have multiple weights or probabilities that depend upon the other words included in the hypothesis. In addition, the word lattice 110 may include all of the possible hypotheses for the set of words included in the word lattice 110 or a subset of the most probable combinations of words from the word lattice 110. The mobile computing device 102 selects the most probable path through the word lattice 110 and presents that hypothesis to the user.

Figure 2:
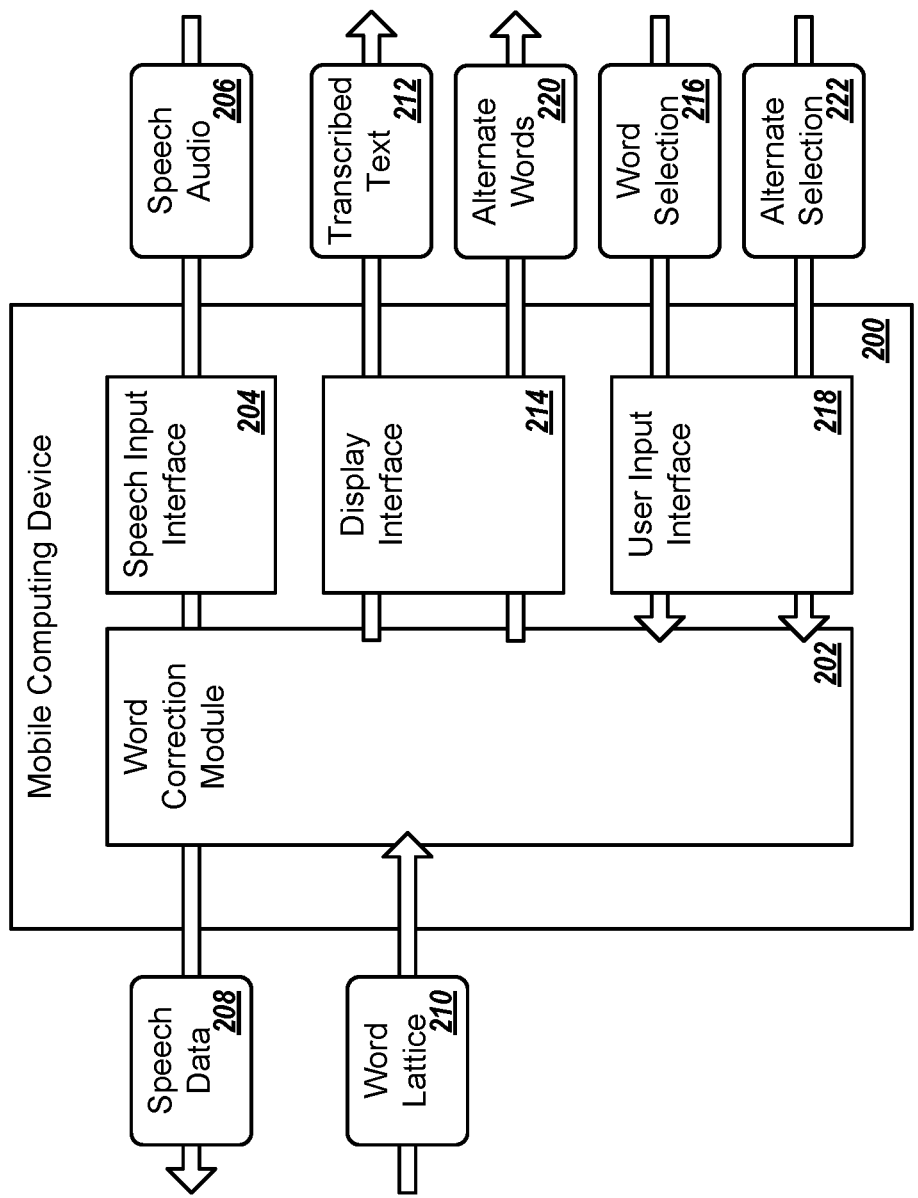
FIG. 2 is a block diagram that shows an example of a mobile computing device for correcting one or more words in transcribed text.

FIG. 2 is a block diagram that shows an example of a mobile computing device 200 for correcting one or more words in transcribed text. The mobile computing device 200 includes a word correction module 202 that is responsible for presenting text transcribed from a user utterance and for receiving one or more user inputs to correct the transcribed text.

In particular, the mobile computing device 200 includes a speech input interface 204 that receives a speech audio input 206 from a user. For example, the speech input interface 204 can be a microphone that converts the sounds in the utterance from the user into a speech data output 208. The speech input interface 204 passes the speech data output 208 to the word correction module 202 and the word correction module 202 sends the speech data output 208 to a transcription system.

The transcription system performs a speech recognition operation on the speech data output 208 to generate a word lattice 210. The transcription system sends the word lattice 210 to the mobile computing device 200.

The word correction module 202 receives the word lattice 210 and presents a transcribed text 212 from the word lattice 210 in a display interface 214. In some implementations, the display interface 214 is a hardware display screen, such as a liquid crystal display (LCD) screen. The transcribed text 212 being presented includes multiple words from the word lattice 210 and the transcribed text 212 includes one or more words to be corrected by the user. The word correction module 202 receives a selection 216 from the user of word in the transcribed text 212 that is incorrect (e.g., not what the user spoke). The word correction module 202 receives the selection 216 through a user input interface 218, such as a touchscreen, a track ball or other pointing device, or a keyboard.

The word correction module 202 presents one or more alternate words 220 for the selection 216. The word correction module 202 displays the alternate words 220 using the display interface 214. The word correction module 202 receives a selection 222 of one of the presented alternate words from the user through the user input interface 218. The word correction module 202 replaces the selection 216 from the transcribed text 212 with the selection 222 from the alternate words and presents the updated transcribed text to the user in the display interface 214.

Figure 3A:
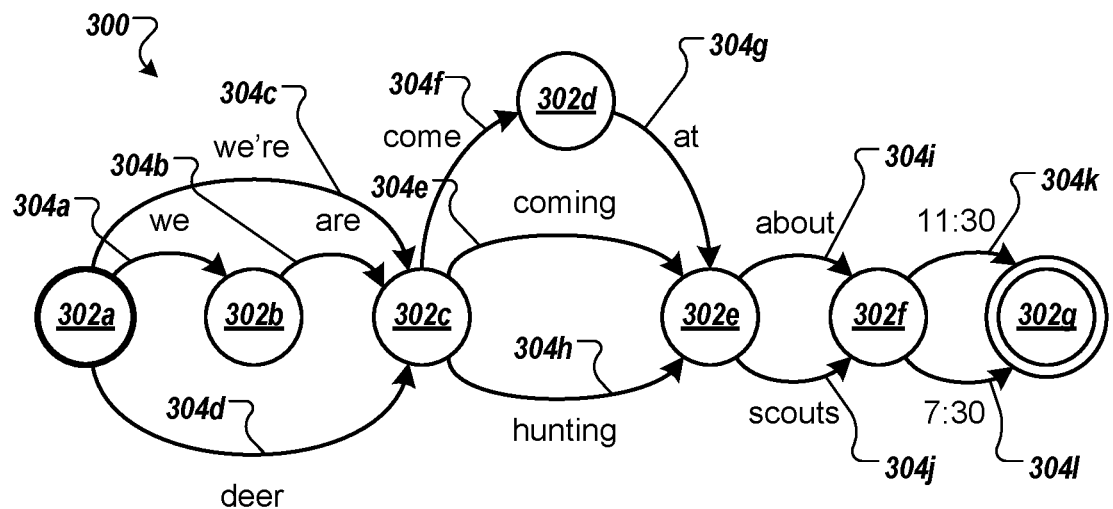
FIGS. 3A-B are examples of word lattices used for correcting one or more words in transcribed text.

FIG. 3A is an example of a word lattice 300 used for correcting one or more words in transcribed text. The word lattice 300 is represented here as a finite state transducer. The word lattice 300 includes one or more nodes 302*a-g* that correspond to the possible boundaries between words. The word lattice 300 includes multiple edges 304*a-l* for the possible words in the transcription hypotheses that result from the word lattice 300. In addition, each of the edges 304*a-l* can have one or more weights or probabilities of that edge being the correct edge from the corresponding node. The weights are determined by the transcription system and can be based on, for example, a confidence in the match between the speech data and the word for that edge and how well the word fits grammatically and/or lexically with other words in the word lattice 300.

For example, initially, the most probable path through the word lattice 300 may include the edges 304*c*, 304*e*, 304*i*, and 304*k*, which have the text "we're coming about 11:30." A second best path may include the edges 304*d*, 304*h*, 304*j*, and 304*l*, which have the text "deer hunting scouts 7:30."

Each pair of nodes may have one or more paths corresponding to the alternate words in the various transcription hypotheses. For example, the initial most probable path between the node pair beginning at the node 302*a* and ending at the node 302*c* is the edge 304*c* "we're". This path has alternate paths that include the edges 304*a-b* "we are" and the edge 304*d* "deer". Accordingly, the edge 304*e* "coming" has alternate words that include the edges 304*f-g* "come at" and the edge 304*h* "hunting". The edge 304*i* "about" has an alternate word that includes the edge 304*j*

"scouts" and the edge 304k "11:30" has an alternate word that includes the edge 304l "7:30".

Figure 3B:
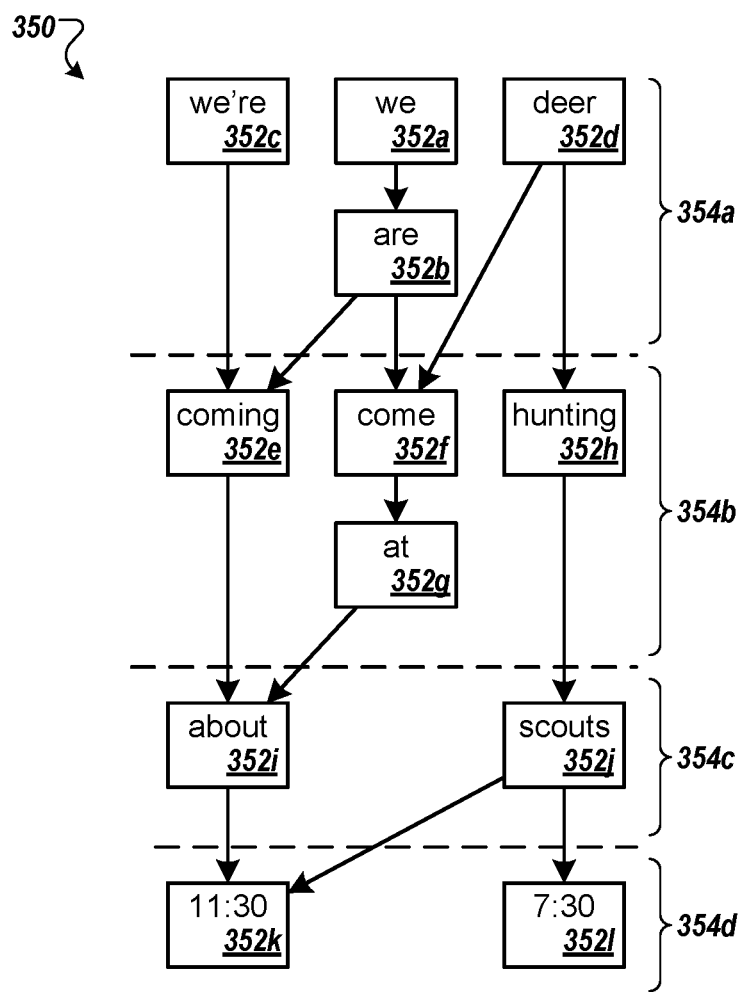

FIG. 3B is an example of a word lattice 350 used for correcting one or more words in transcribed text. The word lattice 350 is a hierarchy. The word lattice 350 includes multiple nodes 352a-l that represent the words in the various hypotheses for the transcribed text. The edges between the nodes 352a-l show that the possible hypotheses include the nodes 352c, 352e, 352i, and 352k "we're coming about 11:30", the nodes 352a, 352b, 352e, 352i, and 352k "we are coming about 11:30", the nodes 352a, 352b, 352f, 352g, 352i, and 352k "we are come at about 11:30", the nodes 352d, 352f, 352g, 352i, and 352k "deer come at about 11:30", the nodes 352d, 352h, 352j, and 352k "deer hunting scouts 11:30", and the nodes 352d, 352h, 352j, and 352l "deer hunting scouts 7:30".

Again, the edges between the nodes 352a-l may have associated weights or probabilities based on the confidence in the speech recognition and the grammatical/lexical analysis of the resulting text. In this example, "we're coming about 11:30" may currently be the best hypothesis and "deer hunting scouts 7:30" may be the next best hypothesis. One or more divisions 354a-d can be made in the word lattice 350 that group a word and its alternates together. For example, the division 354a includes the word "we're" and the alternates "we are" and "deer". The division 354b includes the word "coming" and the alternates "come at" and "hunting". The division 354c includes the word "about" and the alternate "scouts" and the division 354d includes the word "11:30" and the alternate "7:30".

As a user selects words from the best hypothesis for correction and alternates from the other hypotheses to replace the incorrect words, one of the other hypotheses may become the best hypothesis. For example, if the user selects "we're" and then the alternate "deer" to replace "we're", then the "deer hunting scouts 7:30" may become the best hypothesis.

In some implementations, the word correction module only presents and/or allows the user to select alternates for which an edge exists to the other words in the transcribed text. For example, if "we're coming about 11:30" is currently presented as the best hypothesis, the word correction module may present "we are" as an alternate for "we're" but not "deer" because "deer" does not have an edge that connects to the remainder of the transcribed text " . . . coming about 11:30". The words "we are" do have an edge to " . . . coming about 11:30" and are therefore included in the list of alternates for "we're". In another example, if the user selects the word "coming" for correction, the word correction module may expand the selection to include "we're coming" and then present alternates that include "we are come at" and "deer come at".

Figure 4A:
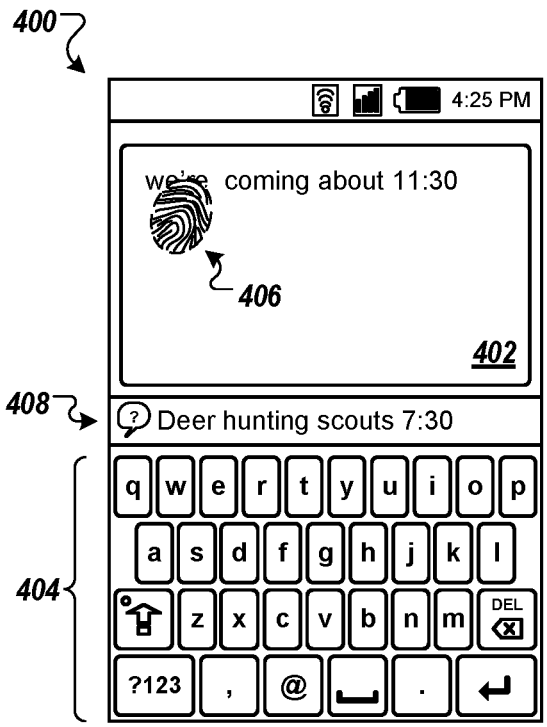
FIGS. 4A-D are examples of graphical user interfaces for correcting one or more words in transcribed text.

FIG. 4A is an example of a GUI 400 for correcting one or more words in transcribed text. The GUI 400 may be associated with an application that receives a text input, such as an instant message application, an email application, or a word processor application. The GUI 400 includes a text input area 402 and a keyboard 404 for inputting text into the text input area 402. In some implementations, the keyboard 404 is a touchscreen keyboard. In some implementations, a computing device that provides the GUI 400 can include a physical keyboard for making inputs into the text input area 402. In addition, a computing device that provides the GUI 400 can receive a voice or speech input. For example, the keyboard 404 can include a control or icon to initiate speech-to-text input into the text input area 402. The word correction module sends the received speech data to the transcription system and receives the word lattice.

The GUI 400 presents a best hypothesis "we're coming about 11:30" in the text input area 402. A user can request that a word be corrected by selecting the word. For example, the user can make a selection 406 of the word "we're" by pressing on the touchscreen. Alternatively, the GUI 400 may have an associated pointing device or other navigation controls to select a word in the text input area 402.

The GUI presents a next best hypothesis "Deer hunting scouts 7:30" in an alternate phrase control 408. A user can select the alternate phrase control 408 to replace the transcribed text in the text input area 402 with the text shown in the alternate phrase control 408.

Figure 4B:
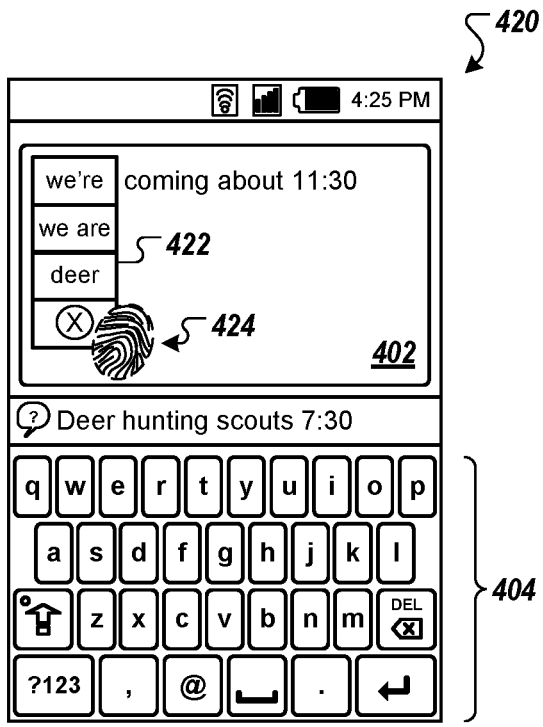

FIG. 4B is an example of a GUI 420 for correcting one or more words in transcribed text. The GUI 420 shows a list 422 of alternate words from the word lattice for the selected word "we're". The list 422 includes the alternates "we are" and "deer". The list 422 also includes a remove control for removing a word from the text input area 402 without replacing it with an alternate. Here, the user makes a selection 424 on the remove control to request that the GUI 420 remove the word "we're" from the text input area 402.

Figure 4C:
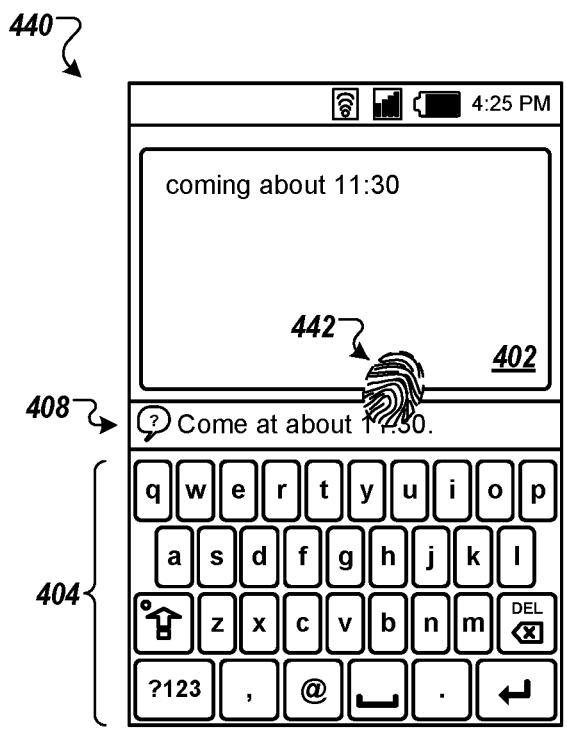

FIG. 4C is an example of a GUI 440 for correcting one or more words in transcribed text. The word correction module has updated the GUI 440 to no longer include the word "we're" in the transcription hypothesis presented in the text input area 402. In addition, the word correction module has updated the alternate phrase control 408 to include a new next best hypothesis "Come at about 11:30." based on the current best hypothesis in the text input area 402 resulting from the correction made by the user. The user can make a selection 442 on the alternate phrase control 408 to request that the text in the text input area 402 be replaced with "come at about 11:30".

Figure 4D:
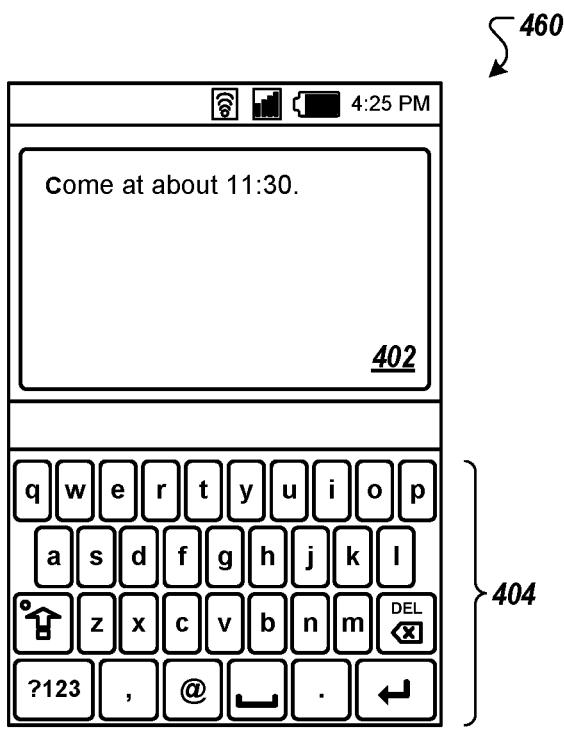

FIG. 4D is an example of a GUI 460 for correcting one or more words in transcribed text. The word correction module has updated the GUI 460 to include the new best transcription hypothesis "Come at about 11:30." requested by the user's selection of the alternate phrase control 408.

In some implementations, the word correction module allows a user to correct a word by making only two simple user inputs. For example, the user may touch the screen to select an incorrect word and then touch the screen a second time to select an alternate to replace the incorrect word.

In some implementations, the word correction module can correct one or more words in response to a single user input. For example, the user can select the alternate phrase control 408 to replace the best hypothesis with the next best hypothesis. In another example, where only one alternative word exists, the word correction module may automatically replace an incorrect word in response to the selection of the incorrect word without providing a list of alternates. In a further example, where the probability of an alternate being correct is significantly greater than the other alternates, the word correction module may automatically replace an incorrect word with the best alternate in response to the selection of the incorrect word without providing a list of alternates. Significantly greater may include for example, a best alternate with a probability near one hundred percent and other alternates with probabilities near zero or a best alternate that is several times more probable than the next best alternate. In some implementations, a long press on a word may indicate that the word should be removed from the text input area 402 and the hypothesis. Alternatively, a long press on an incorrect word may indicate a request to replace the incorrect word with the next best alternate.

Figure 5:
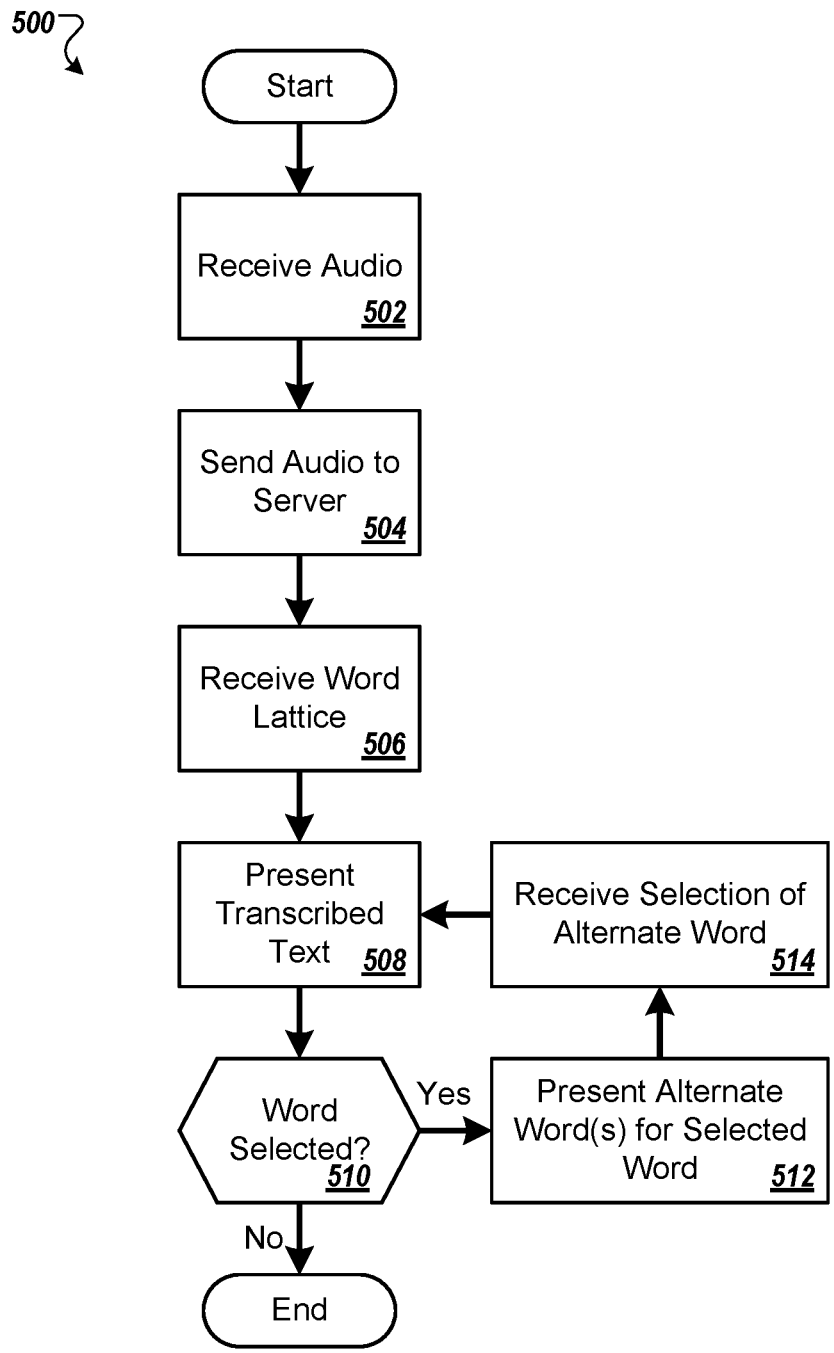
FIG. 5 is a flow chart that shows an example of a process for correcting one or more words in transcribed text.

FIG. 5 is a flow chart that shows an example of a process 500 for correcting one or more words in transcribed text. The process 500 may be performed, for example, by a system such as the system 100, the mobile computing device 200, the word lattice 300, and/or the GUIs 400, 420, 440, and 460. For clarity of presentation, the description that follows uses the system 100, the mobile computing device 200, the word lattice 300, and/or the GUIs 400, 420, 440, and 460 as the basis of examples for describing the process 500. However, another system, or combination of systems, may be used to perform the process 500.

The process 500 begins with receiving (502) speech audio data from a microphone in a mobile computing device. For example, a user may input an utterance into a microphone on a cellular telephone or smartphone.

The process 500 sends (504) the speech audio data from the mobile computing device to a transcription system. For example, the mobile computing device 102 can send the speech data output 108 to the transcription system 104.

The process 500 receives (506), at the mobile computing device, a word lattice transcribed from the speech audio data by the transcription system. For example, the mobile computing device 200 can receive the word lattice 210 transcribed from the speech data output 208.

The process 500 presents (508) one or more transcribed words from the word lattice on a display screen of the mobile computing device. For example, the word correction module 202 can present the transcribed text 212 in the GUI 400.

If the process 500 receives (510), at the mobile computing device, a user selection of at least one of the presented transcribed words, then in response to receiving the user selection of the transcribed word, the process 500 presents (512) one or more alternate words on the display screen from the word lattice for the selected transcribed word. For example, the word correction module 202 can receive the selection 406 of the transcribed word "we're" and in response present the list 422 of alternate words.

The process 500 receives (514), at the mobile computing device, a user selection of at least one of the alternate words. For example, the word correction module 202 can receive the selection 424 of the remove control or a selection of one or more of the alternate words "we are" and "deer" in the list 422.

In response to receiving the user selection of the alternate word, the process 500 replaces (508) the selected transcribed word in the presented transcribed words with the selected alternate word. For example, the word correction module 202 can present the updated transcribed text "coming about 11:30" in the text input area 402 of the GUI 440.

Figure 6:
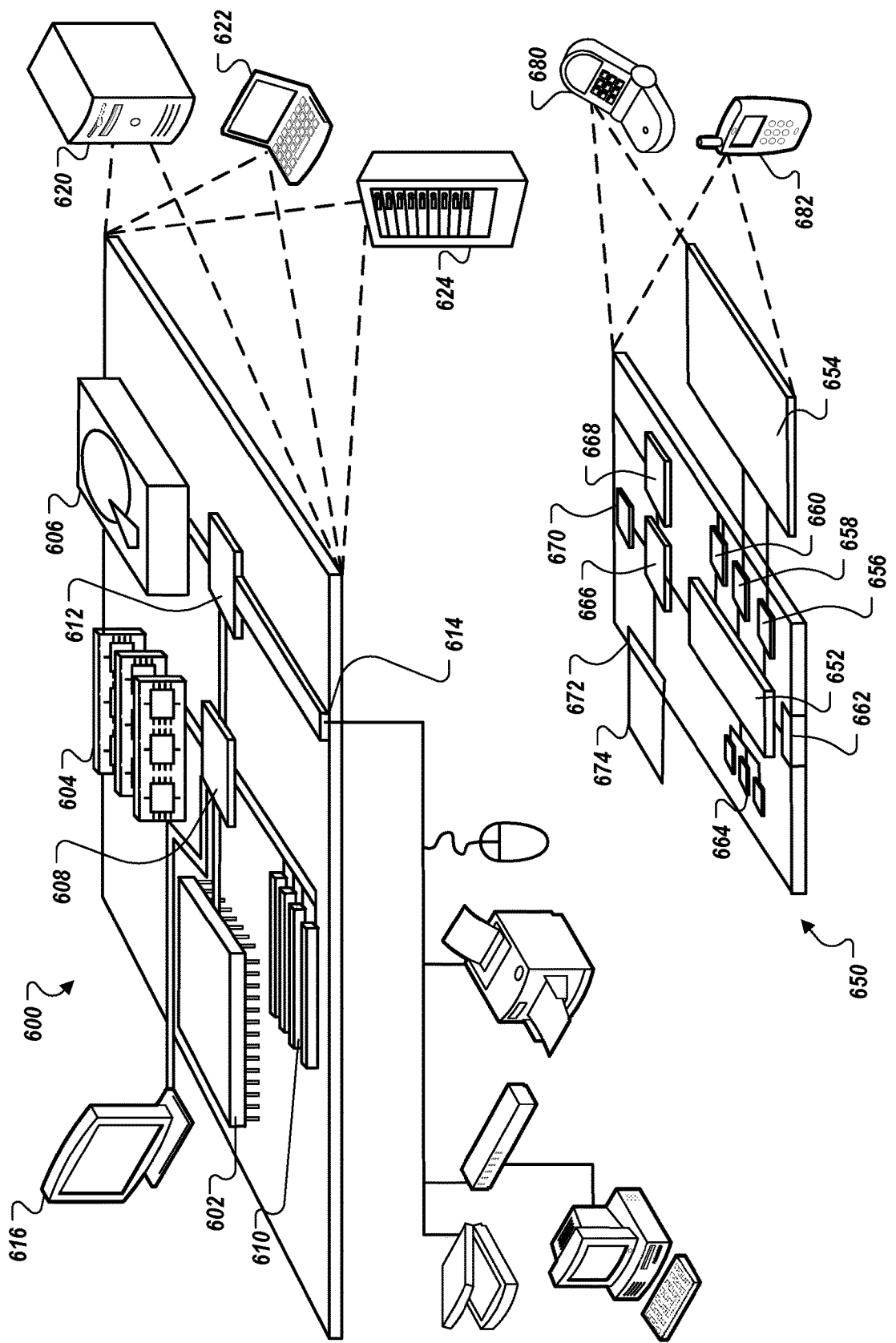
FIG. 6 shows an example of a computing device and a mobile computing device that can be used in connection with computer-implemented methods and systems described in this document.

FIG. 6 shows an example of a computing device 600 and a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method when executed on data processing hardware of a server system causes the data processing hardware to perform operations comprising:
   receiving audio data corresponding to an utterance;
   processing the audio data to obtain a word lattice of words recognized in the audio data, each possible word having an associated speech recognition confidence score; and
   transmitting, over a network, the word lattice to a computing device in communication with the data processing hardware, the computing device configured to display, on a display screen:
      a transcription of the utterance including multiple words from the word lattice; and
      for a respective one of the multiple words included in the transcription of the utterance, one or more alternate words from the word lattice that occur at a same particular location in the word lattice as the respective one of the multiple words.

2. The computer-implemented method of claim 1, wherein the speech recognition confidence score associated with each of the one or more alternate words displayed on the display screen is lower than the speech recognition confidence score associated with the respective one of the multiple words included in the transcription.

3. The computer-implemented method of claim 1, wherein the word lattice comprises:
   nodes corresponding to the words recognized in the audio data; and
   edges between the nodes that identify possible paths through the word lattice.

4. The computer-implemented method of claim 3, wherein the display screen comprises a touch-sensitive display.

5. The computer-implemented method of claim 1, wherein receiving the audio data comprises receiving the audio data over a network.

6. The computer-implemented method of claim 1, wherein the utterance corresponding to the audio data is captured by a microphone.

7. The computer-implemented method of claim 1, wherein the computing device is further configured to display the transcription of the utterance in a first region of the display screen.

8. The computer-implemented method of claim 7, wherein the computing device is further configured to display the one or more alternate words from the word lattice in a second region of the display screen.

9. The computer-implemented method of claim 1, wherein the computing device is further configured to display the one or more alternate words in response to receiving a user input indication indicating selection of the respective one of the multiple words included in the transcription displayed on the display screen.

10. The computer-implemented method of claim 1, wherein the computing device is further configured to:
    receive a user input indication indicating selection of one of the one or more alternate words displayed on the display screen; and
    display, on the display screen, an updated transcription of the utterance that includes the selected one of the one or more alternate words substituted for the respective one of the multiple words.

11. A server system comprising:
    data processing hardware; and
    memory hardware in communication with the data processing hardware and storing instructions that when executed on the data processing hardware cause the data processing hardware to perform operations comprising:
       receiving audio data corresponding to an utterance;
       processing the audio data to obtain a word lattice of words recognized in the audio data, each possible word having an associated speech recognition confidence score; and
       transmitting, over a network, the word lattice to a computing device in communication with the server system, the computing device configured to display, on a display screen:
          a transcription of the utterance including multiple words from the word lattice; and
          for a respective one of the multiple words included in the transcription of the utterance, one or more alternate words from the word lattice that occur at a same particular location in the word lattice as the respective one of the multiple words.

12. The server system of claim 11, wherein the speech recognition confidence score associated with each of the one or more alternate words displayed on the display screen is lower than the speech recognition confidence score associated with the respective one of the multiple words included in the transcription.

13. The server system of claim 11, wherein the word lattice comprises:
   nodes corresponding to the words recognized in the audio data; and
   edges between the nodes that identify possible paths through the word lattice.

14. The server system of claim 13, wherein the display screen comprises a touch-sensitive display.

15. The server system of claim 11, wherein receiving the audio data comprises receiving the audio data over a network.

16. The server system of claim 11, wherein the utterance corresponding to the audio data is captured by a microphone.

17. The server system of claim 11, wherein the computing device is further configured to display the transcription of the utterance in a first region of the display screen.

18. The server system of claim 17, wherein the computing device is further configured to display the one or more alternate words from the word lattice in a second region of the display screen.

19. The server system of claim 11, wherein the computing device is further configured to display the one or more alternate words in response to receiving a user input indication indicating selection of the respective one of the multiple words included in the transcription displayed on the display screen.

20. The server system of claim 11, wherein the computing device is further configured to:
   receive a user input indication indicating selection of one of the one or more alternate words displayed on the display screen; and
   display, on the display screen, an updated transcription of the utterance that includes the selected one of the one or more alternate words substituted for the respective one of the multiple words.

\* \* \* \* \*